United States Patent [19]

Gilead

[11] Patent Number: 5,106,021
[45] Date of Patent: Apr. 21, 1992

[54] IRRIGATION DEVICE

[75] Inventor: Gideon Gilead, Jerusalem, Israel

[73] Assignee: U.S. Farm Products Limited, Hong Kong

[21] Appl. No.: 528,284

[22] Filed: May 24, 1990

Related U.S. Application Data

[63] Continuation of Ser. No. 203,625, Jun. 2, 1988, abandoned.

[30] Foreign Application Priority Data

Jun. 3, 1987 [ZA] South Africa ............ 87/3956

[51] Int. Cl.$^5$ ............ A01G 25/02; B05B 15/00
[52] U.S. Cl. ............ 239/276; 239/542; 239/551; 239/565
[58] Field of Search ............ 239/542, 547, 550, 551, 239/565, 273, 276; 138/42

[56] References Cited

U.S. PATENT DOCUMENTS

| | | | |
|---|---|---|---|
| 2,721,764 | 10/1955 | Wilson, Jr. | 239/547 |
| 3,774,850 | 11/1973 | Zeman | 239/547 |
| 3,792,588 | 2/1974 | Gilaad | 239/542 |
| 4,047,995 | 9/1977 | Leal-Diaz | 239/542 |
| 4,247,051 | 1/1981 | Allport | 239/542 |
| 4,430,020 | 2/1984 | Robbins | 239/542 |
| 4,722,759 | 2/1988 | Roberts et al. | 239/542 |
| 4,763,842 | 8/1988 | Dunn | 239/542 |

FOREIGN PATENT DOCUMENTS

| | | | |
|---|---|---|---|
| 91059 | 10/1983 | European Pat. Off. | 239/542 |
| 196763 | 10/1986 | European Pat. Off. | 239/542 |
| 2726358 | 12/1977 | Fed. Rep. of Germany | 239/542 |
| 2484195 | 12/1981 | France | 239/542 |

Primary Examiner—Andres Kashnikow
Attorney, Agent, or Firm—Browdy and Neimark

[57] ABSTRACT

An irrigation device, especially suited for trickle or drip irrigation comprises a tubular conduit made by connecting opposite edges of at least two plies of plastics, embossing at least one marginal zone of at least one ply to create a labyrinthine passage for liquid. The two plies may be obtained by lengthwise folding an elongated strip of material.

20 Claims, 7 Drawing Sheets

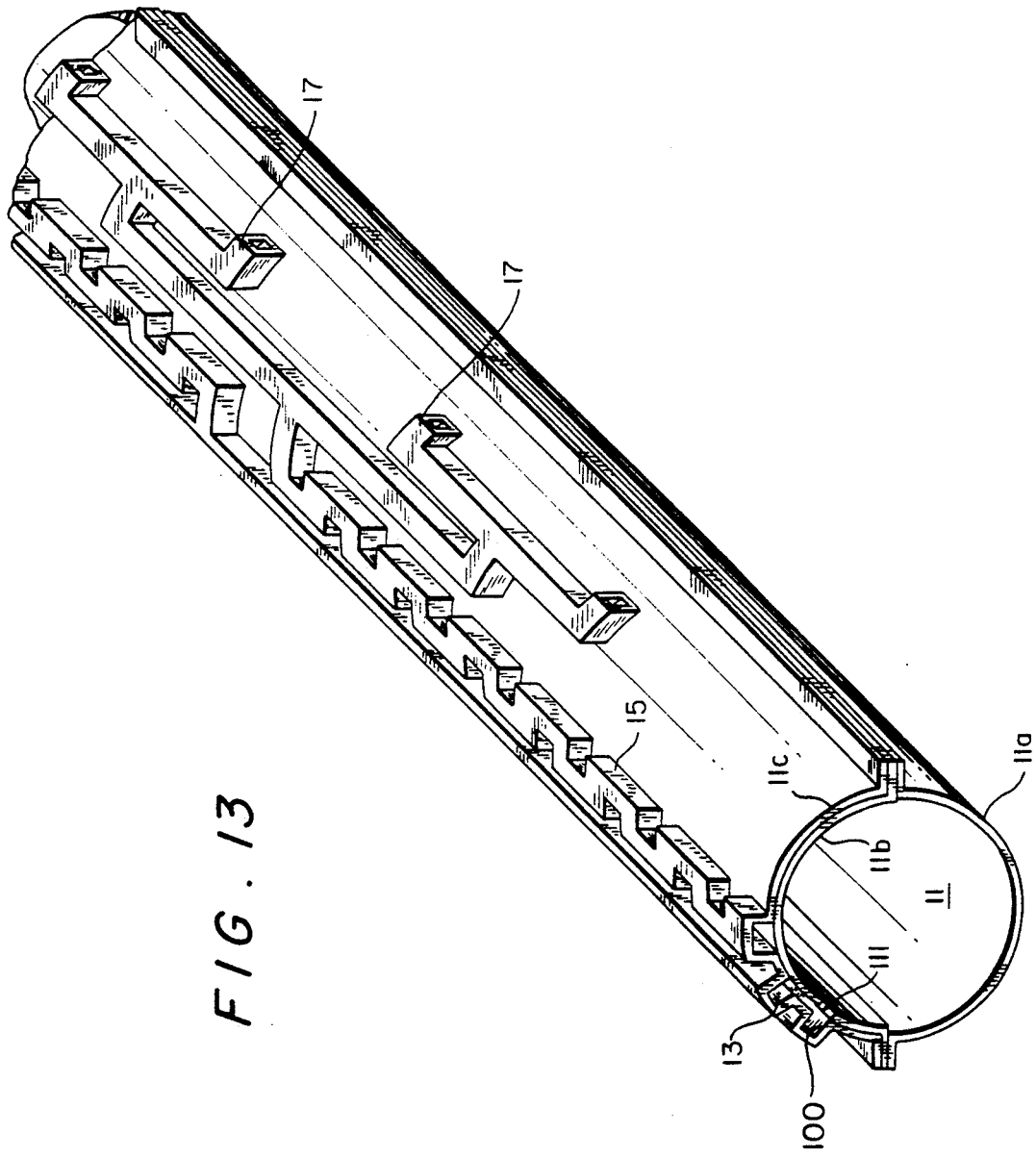

IRRIGATION DEVICE

This application is a continuation of application Ser. No. 07/203,625 filed Jun. 2, 1988, now abandoned.

BACKGROUND OF INVENTION

1. Field of the Invention

The present invention relates to an irrigation device from which the liquid is ejected through a multiple number of openings along the extension of the device.

2. The Prior Art

There have been known already irrigation hoses of rubber or plastics which had openings along their extension from which water was ejected in the form of a spray. These hoses had been produced in a conventional way by extrusion, the openings being made in a subsequent step. It has been known also to insert metallic or plastic nozzles into such openings. As known, the wall thickness of such hoses is considerable.

It is known also to make hose conduits by folding thin plastics sheets and fusing together the free edges of the plastic strip. These hoses—in one form or another—are mainly used for drip or trickle irrigation. Such conduits include usually a labyrinthine passage including numerous bows and bends or are subdivided into a number of chambers with apertures in the partitions between chambers, all of which cause a decrease of pressure in the medium flowing therethrough, until the medium leaves the conduit in the form of a slow trickle or dropwise.

SHORT SUMMARY OF DISCLOSURE

The present invention provides a conduit which is produced by making a tubular conduit either by connecting two or even more plies of plastics along two oppositely disposed edges of at least one of the plies, embossing at least one longitudinal marginal zone of at least one ply, by making a groove, or folding an elongated strip of thin plastics foil and so creating two plies lying on one another, embossing a groove at least at one free longitudinal edge of the strip which—in both said cases—extends at an angle relative to the lengthwise direction of the strip or conduit and fusing or otherwise connecting together the marginal portions of the free edges of the plies, the area of the fused or otherwise connected portion i.e. the length of the groove being greater than the wall thickness of the conduit so produced.

In each of the afore said ways, a hose like conduit is produced from the main lengthwise extension of the interior thereof extend the embossed grooves forming outlet spouts through which a liquid medium flowing in the main conduit can leave as a spray under the pressure prevailing in the main conduit. In certain practical embodiments, the outlet spouts may lead either directly or via a distributing conduit into a labyrinth of the kind referred to above.

The passages, as well as the distributing conduits and the labyrinths—as has been stated—are obtained by embossing the sheet material, the resulting grooves being either in the marginal zone of the plies extending along the main conduit or could be in a portion of one or more of the plies overlying the main conduit or even in the wall of the conduit itself.

These and further features of the invention will becomes clear from the following description which has reference to the accompanying drawings.

BRIEF DESCRIPTION OF DRAWINGS

There are shown—schematically in FIGS. 1–3 the basic forms of conduits according to the invention.

DETAILED DESCRIPTION OF PREFERRED EMBODIMENTS

The outlet spouts as well as the distributing conduits and also the labyrinths obtained by embossing may be of whatever cross-section, i.e. square, semi-circular, circular, trapezoidal or triangular, etc.

Figure 1:
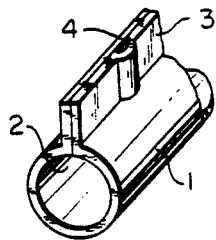
Figure 2:
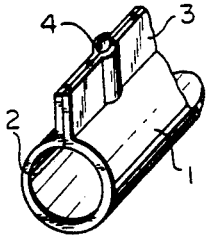
Figure 3:
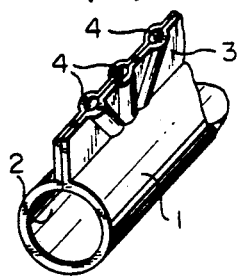
Figure 6:
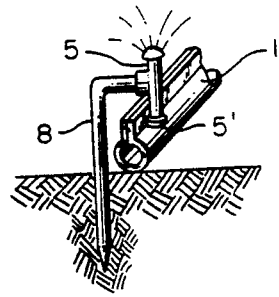
FIG. 6 illustrates (at a smaller scale) a nozzle which is carried on a spike like support, a number of which thus can carry an entire length of conduit.

Turning first to FIGS. 1–3, all these embodiments are constituted by strips 1 of plastics, which are folded or lengthwise bent in such a way as to form a hose 1 which—when under internal pressure—assumes a substantially circular shape 2, from which extends—along its length—radially, a flat portion 3 which is formed by the free marginal portions of the plastic strip and thus consists of two layers which are united with one another by e.g. heat fusing or are glued or cemented to one another. This technique is well known and requires no further elucidation. In order to create the structure comprising the hose or conduit 2 and the radially extending flat portion 3, one or both margins are embossed creating a groove which at the exterior of portion 3 forms a rib. According to FIG. 1 one marginal portion 3 is provided with the embossed groove 4 creating a semi-circular outlet spout which communicates with the interior of conduit 2. Similarly FIG. 6 shows a like arrangement creating an outlet spout into which a spray nozzle can be inserted. (This will be referred to later on).

According to FIG. 2 both marginal portions 3 have been provided with the embossed groove (that of one margin registering with the opposite one) creating a substantially circular outlet spout.

Figure 5:
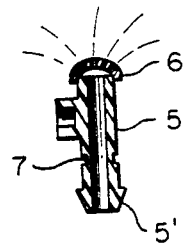
FIG. 5 shows a nozzle which can be inserted into one of the outlet spouts of the new conduit.

FIG. 5 shows a nozzle which is inserted into the outlet 4. The nozzle is indicated as a whole by the numeral 5. It has a lower frustoconical portion 5′ (see FIG. 5) on which is set the nozzle 6 proper. There is provided an annular groove 7 into which an O-ring can be placed, thus preventing leakage from conduit 2 around the nozzle.

The nozzle may be affixed to a peg 8 such that a number of such pegs would hold the conduit 2 in a predetermined position and so making sure that the spray exits from the outlet spouts in a predetermined direction.

In all embodiments shown, the length of the rib 4 is greater than the wall thickness of the respective plastic conduits.

Figure 4:
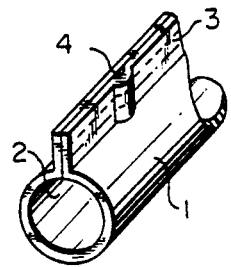
FIG. 4 illustrates an arrangement permitting changing or adjusting the length of the outlet spouts.

In FIG. 4 it is seen that the portion 3 may be cut lengthwise of the conduit (along broken lines), thereby adjusting the length of the outlet spout 4 and consequently the quantity of water emitted from it, and the trajectory of the spray.

Figure 7:
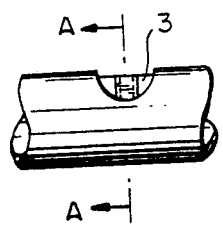
FIGS. 7 and 8 illustrate a specific manner of making the outlet spouts.
Figure 8:
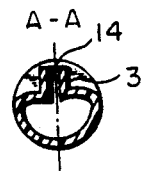

According to FIGS. 7 and 8, the outlet spout 14 is positioned wholly within the hose 1. This can be obtained by embossing the original strip of plastics in the conventional way and folding the strip and connecting to one another opposite areas of the conduit wall along opposite longitudinal edge portions, also in the conventional way.

Figure 9:
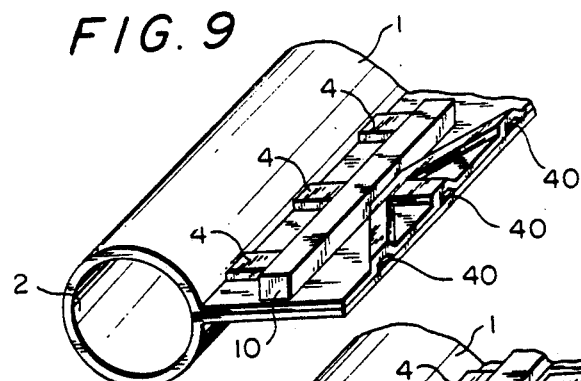
FIGS. 9 and 10 illustrate an incidental and additional effect obtainable by the new conduit.
Figure 10:
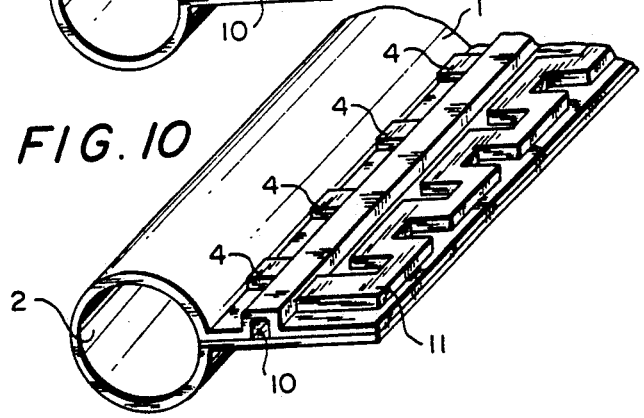

FIGS. 9 and 10 illustrate an addtional feature and additional purpose of the novel irrigation means. Most surprisingly it has been found that an irrigation hose provided with an outlet spout 4 may constitute a most desirable filtering means. The outlet spouts 4 (see FIGS. 9 and 10) can be led to a common distributing conduit 10. This latter, according to FIG. 9 is completely sealed at both its ends and from which branch off outlet spouts 40. Each passage from conduit 10 to a spout 40 is of larger cross-sectional area, as that of the respective spouts 4.

Equally, according to FIG. 10 a passage from distributing conduit 10 leads into a labyrinthine flow conduit 11 of generally known design. Water leaves from passage 11 dropwise or in a slow trickle, as is well known. The labyrinthine conduit 11 may be of whatever known pattern.

Advantageously the passage of water from the interior 2 of hose 1 should be in the form of a narrow slit; grains of sand or other sediment are deposited at that slit but a steady rinsing and flushing takes place and deposits are washed away by the flow of water along the interior of the hose 1. This feature is present in both cases—when the final emission is in the form of a steady flow or a spray according to FIG. 9 as well as in the case of the provision of a labyrinth resulting in trickle or dropwise emission of water.

The different practical embodiments described in connection with FIGS. 1-10 of the drawings result to at least one of the features:

1) The passage from the main feeding line acts as filter.

2) Outlet spouts from the feeding line lead to a labyrinthine conduit from which water is discharged dropwise or in the form of a trickle.

3) From the feeding line extend spouts leading into a distribution conduit from which one or more delivery spouts lead into the open.

Experimental and practical tests have led to the recognition that it is possible to produce irrigation hoses which include all three effects referred to in the preceding paragraph.

There is suggested therefore an irrigation hose, especially for use in drip irrigation which comprises a conduit including at least two interconnected plies of sheet material, overlying one another and being joined to one another at parts of overlying areas, thus having connected by at least one—but preferably several—non-joined sections, thus creating one—but preferably several passages from the conduit, the passage or passages forming spouts the axis of each of which extends at an angle relative to the axis of the conduits, the spout or spouts being of a length which is of larger magnitude than the wall thickness of the conduit, the spout or spouts leading into a distribution conduit from which at least one conduit is branched off leading into a labyrinthine throughflow passage from which further connecting passages lead into outflow liquid dividing emitting conduits.

Figure 11:
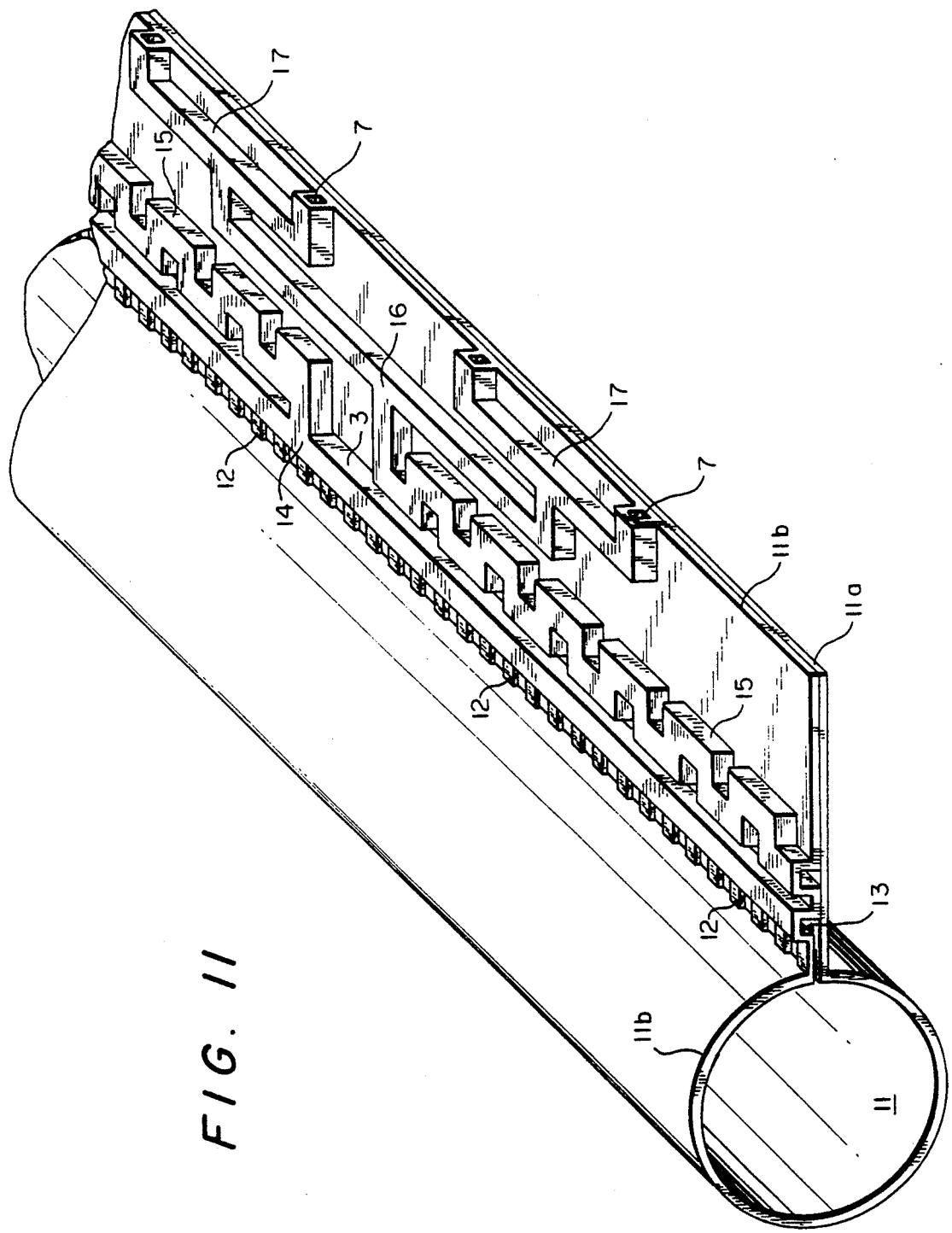
FIGS. 11–14 show in fractional perspective views some practical embodiments.

Turning first to FIG. 11 there is shown a main conduit 11 consisting of a strip of plastic sheet which is folded lengthwise. The two superposed onto one another plies are designated by numerals 11a and 11b. Marginal portions of the strip which extend radially from the inflated part forming the conduit 11 are embossed to form outlet spouts 12 from the interior of conduit 11. These spouts lead into a distribution conduit 13. From the latter connecting passages 14 lead into a labyrinthine conduit 15 of generally known formation. The labyrinthine conduit 15 delivers the water via connections 16 to outwardly emitting conduits 17.

All these conduits are obtained by appropriately embossing the marginal portions 11a and/or 11b, in a known way.

The openings from conduit 11 into spouts 12 as already stated are preferably formed as narrow apertures preventing the passage of grains of sand or other impurities. Such bodies while being prevented from passing into the distributing conduit 13 are continuously removed by the steadily rinsing and flushing flow of water in conduit 11.

From conduit 13 the flow proceeds into the labyrinth 15 through passage 14 where—in a known way—the pressure of the flow is reduced, so that emission of water via passages 17 and from emitting outflow ports 7 occurs in the form of a slow trickle or dropwise.

Figure 11A:
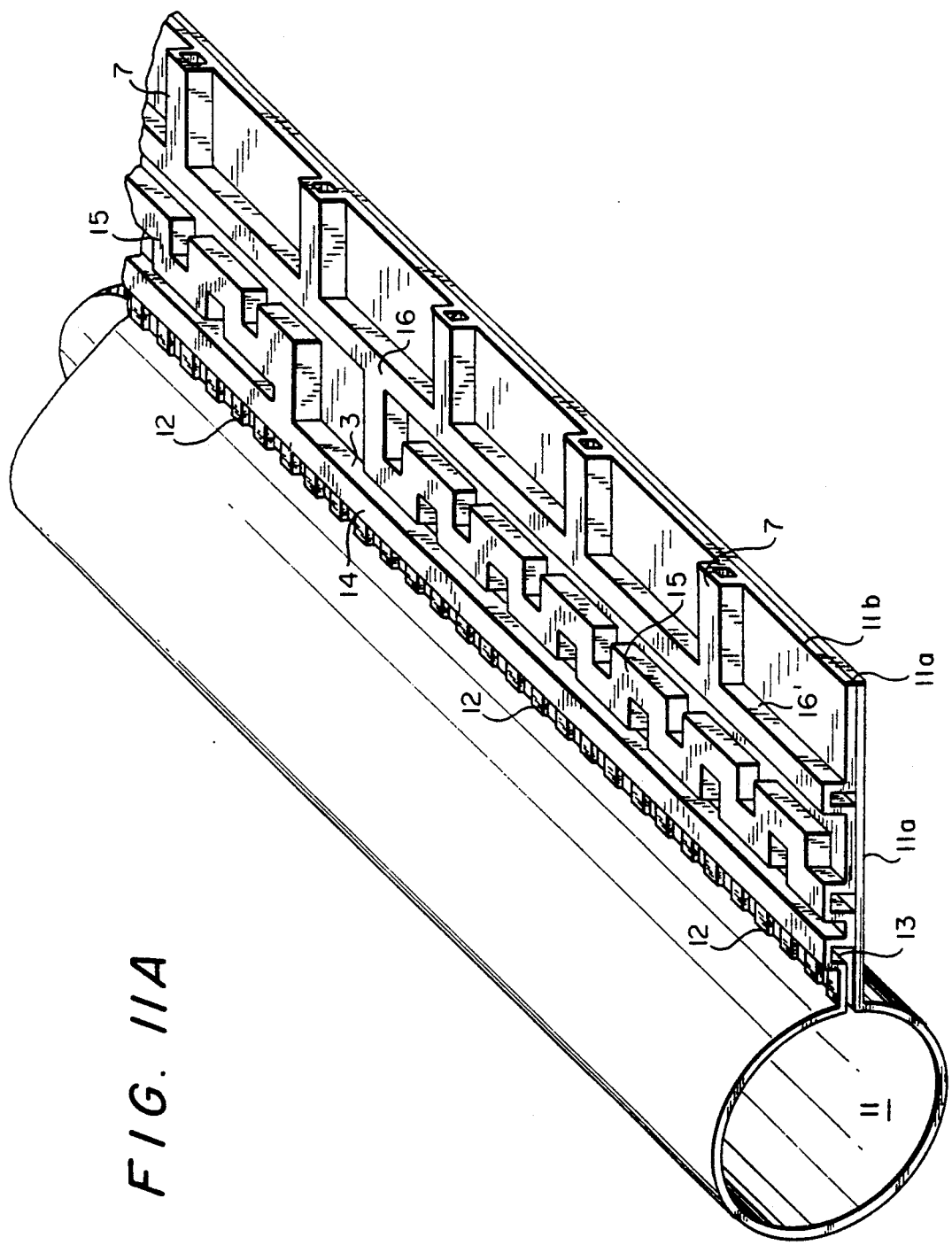

The arrangement of FIG. 11A is similar to that of FIG. 11 and in both Figures the same reference numerals are used for identical parts. In FIG. 11A—however—the labyrinthine conduit 15 feeds via connection 16 a distributing conduit 16' which extends beside the whole length of main conduit 11.

Figure 12:
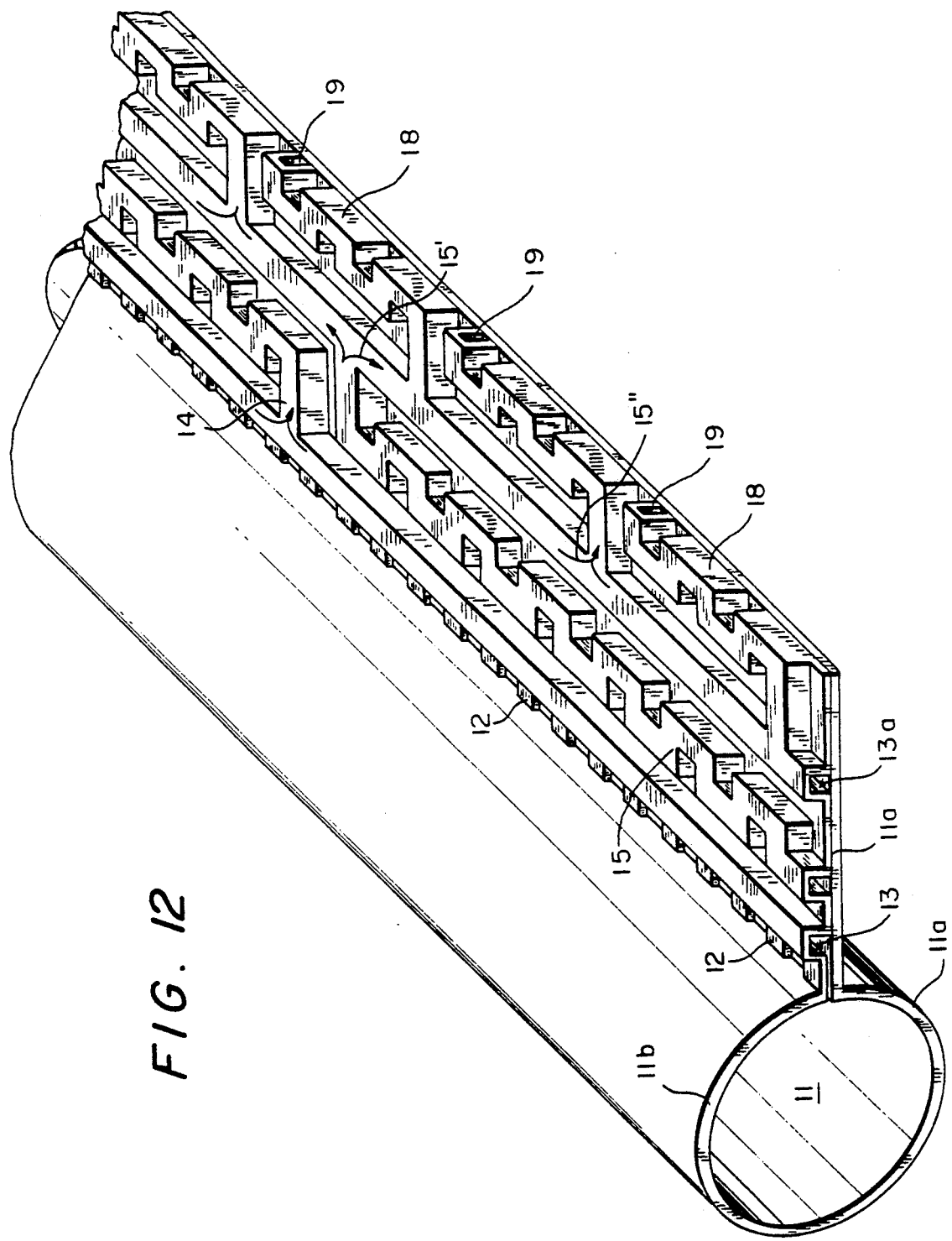

The arrangement shown in FIG. 12 includes—as the one of FIG. 11—the main conduit 11, spouts 12, the distributing conduit 13 from which the passages 14 lead into the labyrinth 15. So far the arrangement is not different of FIG. 11. However, water flows from labyrinth 15 at 15' into a second distributing conduit 13a and from there through 15" to second labyrinth sections 18 from which trickle—or dropwise emission takes place at 19.

The embodiment of FIG. 13 also comprises the main conduit 11 consisting of two distinct parts 11a and 11b, the latter being covered by a third semi-circularly profiled part 11c. All three parts 11a, 11b and 11c are joined together at their contacting surfaces and longitudinal free edges. Part 11c is embossed to form a distributing conduit 100 which communicates with the interior of conduit 11 via at least one aperture 11l in part 11b. Spouts (not seen in the drawing but equivalent to passages 14 of the already described embodiments) lead via a distributor conduit 13 into a labyrinth 15 from which emitting outflow spouts 17 are branched off. Since the conduit 100 conduit 13 and the labyrinth 15 are included in part 11c, the whole assembly is—in this case—not positioned in a portion radially extending from conduit 11, but lies on the outside of conduit 11 proper.

Figure 13A:
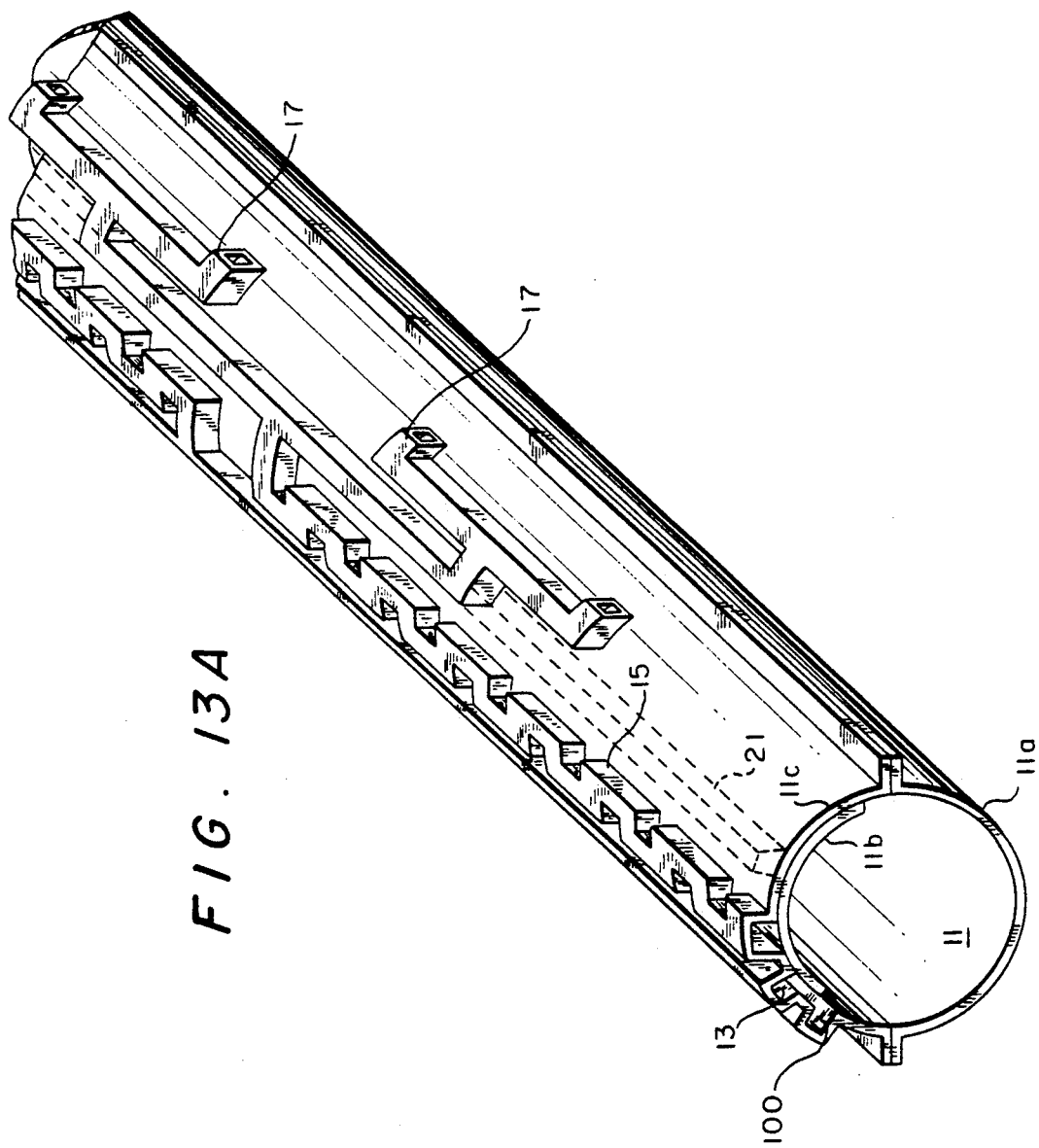

The embodiment shown in FIG. 13A is almost identical with that of FIG. 13, but—as shown by broken lines—the first stage of the emitting outflow spouts 17 could extend the whole length besides the conduit 11. Incidentally, ply 11b—in this case—does not reach to the edges of 11a and 11c.

Figure 14:
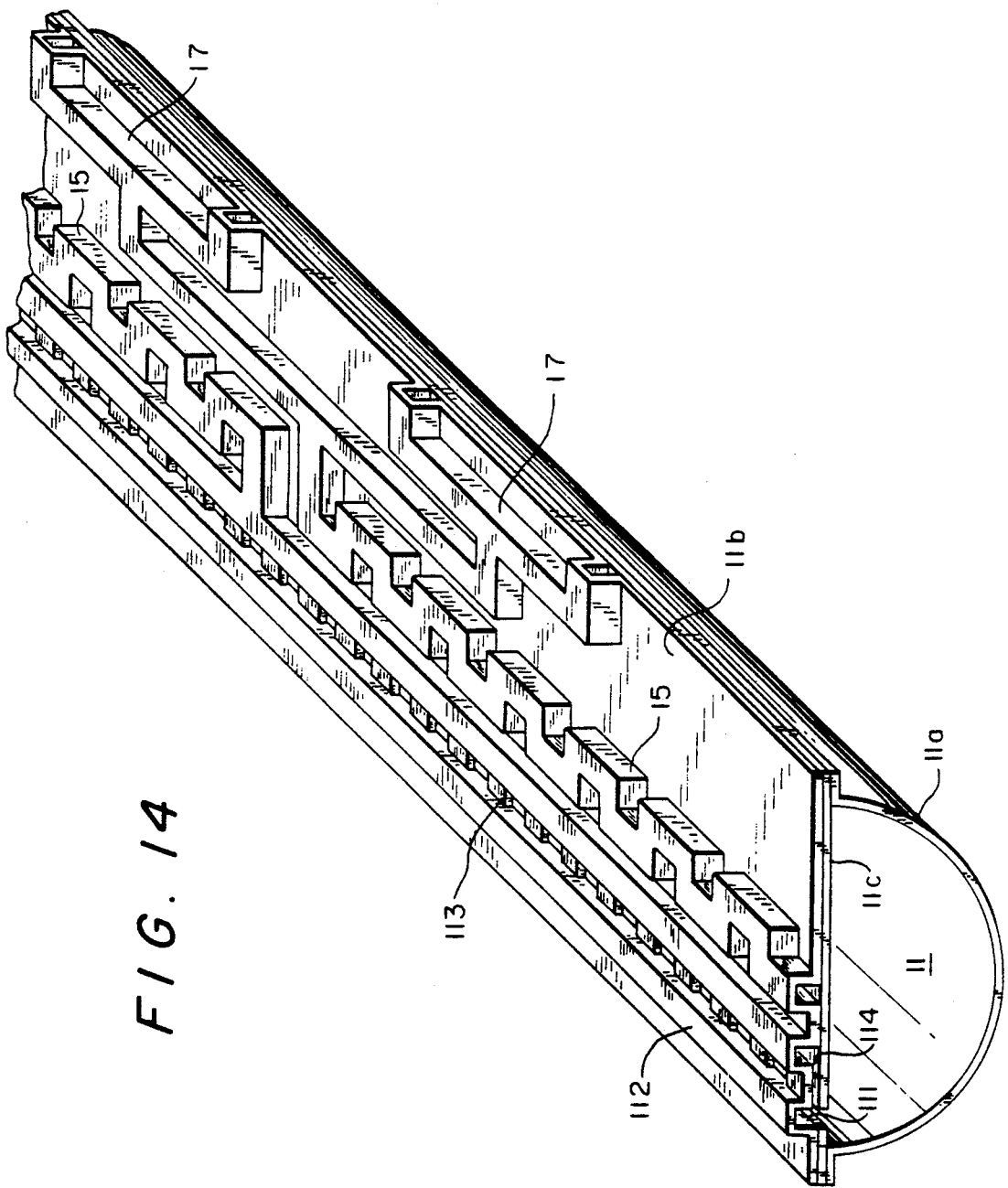

The embodiment of FIG. 14 is similar to that of FIG. 13. But according to FIG. 14 the ply 11a is connected along both its longitudinal edges with interposition of a plane sheet 11c to a flat sheet 11b which had been embossed in the same way as part 11c in FIG. 13, creating a first distributing conduit 112 into which water flows from conduit 11 via opening 111 and from there through spouts 113 into a second distributing conduit 114 and from there into the labyrinth 15 and emitting spouts 17 as described.

In all the embodiments shown filtering of the water takes place—in the manner described—at the passage from the main conduit into a distributing conduit, the water is then made to flow through a labyrinth for the purpose of reducing pressure and the flow is finally divided into several sections which are emitted strictly separated from one another, or not.

I claim:

1. An irrigation device comprising a water supply conduit which is fed with water from a water supply system and which includes at least two overlying plies which are joined together by a common joint, the joint of the plies being interrupted by non-joined sections thus creating a plurality of passages from the conduit, said passages forming a plurality of filtering spouts, a longitudinal axis of each of the plurality of spouts extending at an angle relative to a longitudinal axis of the conduit, and wherein said plurality of spouts, have a narrow aperture for preventing passage of impurities, said plurality of filtering spouts leading from the supply conduit into a distribution conduit and wherein the distribution conduit has a larger aperture than said narrow aperture.

2. The irrigation device claimed in claim 1, wherein said irrigation device has at least one length of sheet material folded about a lengthwise extending median line to form at least two plies connected with one another at free edges of the material.

3. The irrigation device claimed in claim 1, wherein at least two filtering spouts is created by embossing a groove are at least one ply at points where the plies are to remain unconnected, so forming an exit spout from the conduit.

4. The irrigation device claimed in claim 1, further comprising nozzles inserted into at least one spout.

5. The irrigation device claimed in claim 4, further comprising a peg attached to at least one nozzle.

6. The irrigation device claimed in claim 1, wherein the joints of individual plies are effected by heat fusing the plies.

7. The irrigation device claimed in claim 1 wherein the filtering spouts have cross-sectional areas in portions leading from the water supply conduit into the distribution conduit which are smaller than that of portions of a spout leading from the distribution conduit to the outside.

8. The irrigation device claimed in claim 1 wherein the distribution conduit is sealed at least at one of its ends.

9. The irrigation device claimed in claim 1, wherein spouts from the distribution conduit lead into a passage comprising bows and bends which lengthen the flow path in said passage.

10. The irrigation device as claimed in claim 1 wherein at least one conduit is branched off leading into a labyrinthine throughflow passage from which further connecting passages lead into outflow liquid emitting conduits.

11. The irrigation device claimed in claim 10, wherein said distributing conduit is elongated and said labyrinth passage partitions the flow of water into a number of different flows each of which is quantitatively decreased due to frictional loss of velocity.

12. The irrigation device claimed in claim 10, wherein said distributing conduit is elongated and said labyrinth passage delivers the water into a second distributing conduit, and partitions the flow of water into a number of different flows each of which is quantitatively decreased due to frictional loss of velocity.

13. The irrigation device claimed in claim 10, wherein a semi-circularly or arch profiled strip is provided with the supply conduit.

14. The irrigation device as claimed in claim 1, further comprising at least one emitter spout branched off of said distribution conduit.

15. An irrigation device comprising a water supply conduit which is fed with water from the mains having at least two mutually overlying plies which are joined together, the joint of the plies being interrupted by non-joined sections thus creating a plurality or passages from the supply conduit,
   (a) wherein said passages form a plurality of filtering spouts each having an axis, the axis of each of the said filtering spouts extending at an angle relative to a longitudinal axis of the supply conduit, and
   (b) wherein said spouts are each longer than the wall thickness of the supply conduit,
   (c) wherein said filtering spouts lead from the supply conduit into a distribution conduit from which emitter spouts are branched off,
   (d) wherein each filtering spout has a cross sectional area leading from the supply conduit into the distribution conduit which is smaller than a portion of the passages of the spouts from the distribution conduit to the outside, and
   (e) wherein said filtering spouts are created by embossing a groove in at least one ply at points where the plies are to remain unconnected so forming an exit spout from the supply conduit.

16. The irrigation device claimed in claim 15, wherein said irrigation device has of at least one length of sheet material folded about a lengthwise extending median line to form said at least two plies connected with one another at its free edges.

17. The irrigation device claimed in claim 15, wherein said distribution conduit which is sealed at least at one of its ends.

18. The irrigation device claimed in claim 17, wherein the spouts from the distribution conduit lead into a passage comprising bows and bends which lengthen the flow path in said passage.

19. The irrigation device claimed in claim 15 wherein said distribution conduit is elongated and connected to labyrinth passages which deliver the water into a second distribution conduit, thereby partitioning the flow of water into a number of different flows each of which is quantitatively decreased due to friction.

20. The irrigation device claimed in claim 19, comprising a second labyrinth connected to said second distribution conduit formed of bows and bends from which second labyrinth water is emitted in the form of a trickle or dropwise.

* * * * *